United States Patent [19]

Pelton et al.

[11] Patent Number: 5,055,229
[45] Date of Patent: Oct. 8, 1991

[54] SILICONE ANTIFOAMS

[75] Inventors: Robert H. Pelton, Mahopac, N.Y.; Errol D. Goddard, Haworth, N.J.

[73] Assignee: Union Carbide Chemicals and Plastics Technology Corporation, Danbury, Conn.

[21] Appl. No.: 293,545

[22] Filed: Jan. 3, 1989

Related U.S. Application Data

[63] Continuation of Ser. No. 947,876, Dec. 30, 1986, abandoned.

[51] Int. Cl.⁵ .............................................. B01D 17/00
[52] U.S. Cl. ..................................... 252/321; 252/358
[58] Field of Search ................................ 252/321, 358

[56] References Cited

U.S. PATENT DOCUMENTS

| 3,383,327 | 5/1968  | Sullivan ........................... 252/358 |
| 3,455,839 | 7/1969  | Rauner ............................ 252/321 |
| 3,555,109 | 1/1971  | Getson ............................ 260/825 |
| 3,560,401 | 2/1971  | O'Hara et al. .................... 252/358 |
| 3,691,091 | 9/1972  | Koerner .......................... 252/358 |
| 4,082,690 | 4/1978  | Farminer ......................... 252/321 |
| 4,145,308 | 3/1979  | Simoneau et al. ................. 252/321 |
| 4,468,491 | 8/1984  | Steinberger et al. ............. 524/493 |
| 4,486,336 | 12/1984 | Pape et al. ...................... 252/321 |
| 4,514,319 | 4/1985  | Kulkarni et al. ................. 252/321 |
| 4,559,162 | 12/1985 | Abel et al. ...................... 252/321 |
| 4,597,894 | 7/1986  | Abe et al. ....................... 252/358 |
| 4,719,034 | 1/1988  | Yamada et al. ................... 252/358 |
| 4,741,861 | 5/1988  | Okada et al. .................... 252/358 |

FOREIGN PATENT DOCUMENTS 1337022 11/1973 United Kingdom .

Primary Examiner—Catherine S. Kilby Scalzo
Attorney, Agent, or Firm—Bonnie L. Deppenbrock

[57] ABSTRACT

A durable, effective foam suppressant composition produced through free-radical polymerization of mixtures of polydiorganosiloxanes, silica and a free radical polymerization initiator, and optionally, vinyl monomer(s) and pendant vinyl modified silicone oil, followed by dilution of the resulting reaction product with a low viscosity polysiloxane is disclosed. Also disclosed are methods for its production and use in suppressing foams in liquid mediums.

36 Claims, No Drawings

SILICONE ANTIFOAMS

This application is a Continuation of prior U.S. application Ser. No. 947,876, filing date 12-30-86, now abandoned.

BACKGROUND OF THE INVENTION

1. Field of the Invention

This invention relates to novel silicone antifoams, their preparation and use in the prevention of foam formations and the suppression of existing foam in liquid mediums.

2. Description of the Prior Art

Foaming may occur in many industrial processes, such as those in the chemical, food preparation or petroleum industries causing overflow of liquid-containing vessels. This can lead to clogging of overflow lines and relief valves. Furthermore, operating personnel may be exposed to hazardous liquids and vapors. Even when confined to the vessel, foams occupy volume and thereby subtract from its productive capacity.

Specific examples of foaming problems include aqueous processes, such as paper making, wood pulping and emulsion polymerization. Foaming is also a problem with processes involving liquid hydrocarbons, such as petroleum refinery processes, wellhead separation of gas from oil; general hydraulic and lubricating processes.

To avoid foaming, or ameliorate the effects of foaming, foam suppressant compositions are often added to foaming liquids, or to potentially foaming liquids. A composition added to a liquid before it foams, to prevent excessive foaming, is commonly termed an "antifoam". A composition added to destroy foam existing in a liquid, is commonly termed a "defoamer". The term "foam suppressant" composition, as used herein, encompasses both these terms.

It is known to add small amounts of various silicone compositions to either aqueous liquids or hydrocarbon liquids to suppress foam.

U.S. Pat. No. 3,445,839 discloses an aqueous defoaming composition consisting essentially of a polydimethylsiloxane fluid, and a silica aerogel.

U.S. Pat. No. 3,691,091 discloses a silicone emulsion for defoaming aqueous liquids, in which the silicone consists essentially of a polydimethylsiloxane fluid, silica, and an organosilicon compound or oligomer containing alkoxy and/or silanol groups.

U.S. Pat. No. 4,082,690 discloses a silicone composition, useful for reducing foam in non-aqueous liquids, consisting essentially of a polydimethylsiloxane, and a hydrocarbon solvent.

U.S. Pat. No. 4,486,336 discloses the use of mixtures of high and low viscosity silicone oils and polydimethyl siloxane fluids which are compatible with mineral oils.

Other foam suppressant compositions are directed to both aqueous liquids and hydrocarbons liquids. To be useful in both said liquids, it is desirable that a foam suppressant composition be stable upon emulsification, and also stable upon dispersion in a hydrocarbon solvent, in order to facilitate foam suppression.

U.S. Pat. No. 4,145,308 discloses foam suppressant compositions, useful in both aqueous and hydrocarbon liquids, consisting essentially of a polydimethylsiloxane, and fumed or precipitated silica.

U.S. Pat. No. 3,383,327 discloses a foam control agent prepared from a polydiorganosiloxane fluid, silica, and an hydroxylated polydimethylsiloxane.

Vinyl polymerization in silicone-containing media is known, as shown by, for example, British Patent No. 1,337,022 which discloses the use of silicone block copolymers as stabilizers for vinyl polymerizations in alkane solvents.

U.S. Pat. No. 3,555,109 discloses the preparation of dispersions by polymerization in low viscosity (<6000 cst.) silicone oils.

U.S. Pat. No. 4,468,491 discloses the preparation of foam suppressants made by free radical grafting of polyethers onto siloxanes in the presence of vinyl monomer.

While the prior art does produce foam suppressant compositions, certain problems remain. Relatively high silica levels, chemical treatment of the silica, and relatively high resin contents tend to increase the cost of manufacture of these compositions. Moreover, the durability of conventional antifoams is less than satisfactory, requiring its frequent addition during continuous processing. Continuous monitoring of the system for form formation is therefore required.

It is therefore an object of the present invention to provide effective, durable and economical foam suppressant compositions and methods for their manufacture. It is a further object of the present invention to provide a satisfactory method for the suppression of foam formation in industrial processing.

SUMMARY OF THE INVENTION

The present invention provides foam suppressant compositions produced through free radical polymerization of mixtures of polydiorganosiloxanes, at least one free radical initiator, silica, and optionally, pendant vinyl modified silicone oil, and/or vinyl monomer(s), followed by dilution of the resulting high viscosity reaction product with a relatively low viscosity polysiloxane.

The present invention further provides to processes for the production of the foam suppressants and to suppression of foams through their use.

DETAILED DESCRIPTION OF THE INVENTION

In accordance with the present invention, foam suppressant compositions are produced through free-radical polymerization of mixtures of polydiorganosiloxanes, at least one free radical initiator, silica, and, optionally, pendant vinyl-modified silicone oil and/or vinyl monomer(s), followed by dilution of the resulting high viscosity reaction product with a relatively low viscosity polydiorganosiloxane.

The polydiorganosiloxanes which participate in the free-radical polymerization are essentially linear and may be represented by the formula

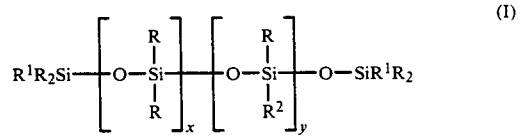

(I)

wherein R represents an alkyl group having from 1 to about 6 carbon atoms; R$^1$ represents a hydrogen atom, a hydroxyl group, an alkyl group having from 1 to about 16 carbon atoms, an epoxy group having from 2 to about 16 carbon atoms or the group —OR$^3$ wherein R$^3$ represents an alkyl group having from 1 to about 16 carbon atoms, an arylalkyl group having from about 7 to about 23 carbon atoms or —OR$^3$ may be a polyoxyalkylene group having a molecular weight of from about 50 to 5000; R$^2$ represents an alkyl group having from 1 to about 16 carbon atoms, a phenyl group, a hydrogen atom, an alkyl-substituted phenyl group wherein the alkyl group contains from 1 to about 6 carbon atoms, an epoxy group having from about 2 to about 16 carbon atoms, or a polysiloxane group having a molecular weight of from about 100 to about 10,000; y is an integer ranging from 0 to about 10,000; and the sum of x and y ranges from about 500 to about 10,000.

Preferably R, R$^1$ and R$^2$ are methyl groups, x is an integer ranging from about 600 to about 4000, y is 0. More preferably, R, R$^1$ and R$^2$, are methyl groups and x ranges from about 800 to about 2000.

The above described polydiorganosiloxanes are included in amounts, based upon the total weight of the non-optional reactants (before final dilution), of from about 80 to about 98 wt. %. Preferably, the polyorganosilanes are employed in amounts of from about 85 to about 95 wt. %. Most preferably, about 90 wt. % of the polyorganosilane is employed.

The silica component of the present invention is comprised of amphorous silica, such is commercially available from numerous sources, such as Tulco, Inc. of Ayer, Mass.

The amorphorous silica which may be employed in the present invention has a surface area of from about 50m$^2$/g to about 400m$^2$/g and the majority of the silica particles possess a particle size less than about 100 micrometers as determined by the Hegman Gauge. More preferably, the silica has a surface area from about 100m$^2$/g to about 300m$^2$/g and a particle size less than about 50 micrometers as determined by the Hegman Gauge. Amphorous silica is available in three main types, classified according to the method of its manufacture. These three types are silica gel, fume silica, and precipitated silica, all of which may be employed in the practice of the present invention if the above-outlined criteria are met.

Silica gel is manufactured by acidifying an aqueous solution of sodium silicate, which causes the formation of an SiO$_2$ gel. This SiO$_2$ gel is mechanically pulverized. Salts and acids are then removed by washing. The material is then dried.

Fume silica is obtained by condensing vapors of SiO$_2$. SiO$_2$ vapors can be generated by heating crystalline SiO$_2$, such as high purity quartz, passing crystalline SiO$_2$ into a high temperature plasma arc, or most commonly, the SiO$_2$ vapors can be produced by reacting SiCl$_4$ and H$_2$ with O$_2$.

Precipitated silica can be produced by chemically destabilizing an aqueous solution of sodium silicate. A fine precipitate is formed upon chemical destablization, and said precipitate is subsequent)y washed and dried.

The amorphous silica used in the compositions of the present invention can further be prehydrophobized such as, for example, with silicone oil, trimethylchlorosilane or hexamethyldisilazane.

While any amorphous silica having the required surface area and particle size can be used to form the compositions of the present invention, the use of prehydrophobized fumed silica having a surface area of from about 100 to about 300 m$_2$/g and particle sizes of less than about 50 micrometers as determined by the Hegman Gauge is preferred.

Amorphous silica is present from about 0.10% to about 30%, by weight, based on the total weight of the non optional reactants (before final dilution). More preferably, the silica component is present from about 0.1% to about 10%, by weight, based on the total weight of the non-optional reactants. Most preferably, the silica component is present from about 2.0% to about 4.0% by weight, based on the total weight of the non-optional reactants (before final dilution).

In a preferred embodiment of the present invention. pendant vinyl-modified silicone oil is also present in the reaction medium prior to free-radical polymerization. It has been found that its presence in the amounts described below produces highly uniform foam suppressants. This material may be represented as follows:

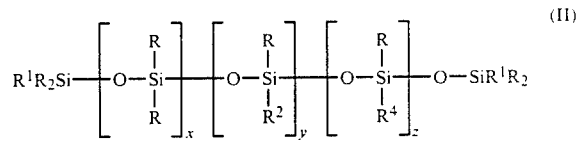

wherein R represents an alkyl group having from 1 to about 6 carbon atoms; R$^1$ represents a hydrogen atom, a hydroxyl group, an alkyl group having from 1 to about 16 carbon atoms, an epoxy group having from 2 to about 16 carbon atoms or the group —OR$^3$ wherein R$^3$ represents an alkyl group having from 1 to about 16 carbon atoms, an arylalkyl group having from about 7 to about 23 carbon atoms or —OR$^3$ may be a polyoxyalkylene group having a molecular weight of from about 50 to about 5000; R$^2$ represents an alkyl group having from 1 to about 16 carbon atoms, a phenyl group, a hydrogen atom, an alkyl substituted phenyl group wherein the alkyl group contains from 1 to about 6 carbon atoms, an epoxy group having from about 2 to about 16 carbon atoms, or a polysiloxane group having a molecular weight of from about 100 to about 10,000; R$^4$ represents a vinyl group containing from 2 to about 24 carbon atoms; y is an integer ranging from 0 to about 10,000; z is an integer ranging from 0 to about 400;. and the sum of x, y and z ranges from about 500 to about 10,000.

Preferably R and R$^1$ are methyl groups, x is an integer ranging from about 3,000 to about 10,000, y is 0 and z is an integer ranging from about 5 to 25. More preferably, R and R$^1$ are methyl groups, x has a value of from about 5,000 to about 8000, y is zero and z has a value of from about 5 to about 20. Most preferably, R and R$^1$ are methyl groups, y is zero, x has a value of from about 6,000 to about 8,000 and z has a value of about 14.

The above-described pendant vinyl-modified silicone oil is included in the reaction medium in amounts, based upon the total weight of the previously described non-optional reactants, in amounts ranging from about 1 to about 20 wt %. Preferably, it is included in amounts ranging from about 2 to about 10 wt. %. Most preferably, it is present in an amount of about 5 wt. %.

Vinyl monomer(s) which may optionally be employed in accordance with the instant invention are exemplified in the following list.

Olefins, such as ethylene, propylene and isobutylene; vinyl esters of aliphatic or aromatic carboxylic acids, preferably vinyl acetate, vinyl propionate, a,|-unsaturated mono- or dicarboxylic acid and its derivatives, (meth)acrylic acid, methyl (meth)acrylate, ethyl (meth)acrylate, propyl or isopropyl (meth)acrylate, n-butyl, iso-butyl or tert butyl (meth)acrylate, 2-ethyl-hexyl(meth)acrylate, (meth)acrylamide, N-alkyl-substituted (meth)acrylamide derivatives, (meth)acrylonitrile, maleic anhydride, maleic acid amide, N-alkyl-malemide, maleic acid half esters or diesters, vinyl aromatics, such as styrene, alphamethylstyrene, and 4-chloro-styrene, vinyl chloride, vinylidene chloride, vinylidene fluoride, tetrafluoroethylene, vinyl ethers, such as ethyl vinyl ether or n-butyl vinyl ether; allyl compounds, such as allyl alcohol, allyl acetate, isobutene diacetate, 2-methylenepropane-1,3-diol, allyl ethyl carbonate and allyl phenyl carbonate; and mixtures thereof.

Vinyl acetate and methyl methacrylate are preferably used. Most preferred is methyl methacrylate.

If crosslinking or an increase in the molecular weights of the vinyl material is desired, divinyl compounds or diallyl compounds may also be employed. Divinyl benzene, (meth)acrylates of polyhydric alcohols, such as, for example, ethylene glycol dimethacrylate and diethyleneglycol diacrylate, and divinyl ether may be used.

The vinyl monomer(s) are present in amounts ranging from about 0 to about 20 wt. %, based upon the total weight of the non optional reactants. Preferably, they are present in amounts ranging from about 0 to about 10 wt. %. Most preferably, they are present in an amount of about 5 wt. %.

The free-radical polymerization can be initiated in any known manner, such as with the aid of free-radical formers; UV radiation; or alpha-, beta- or gamma-radiation, or thermally, without further additives. The radiation-initiated polymerization may also be carried out in the presence of sensitizers, as taught in, for example, Jenkins, A. Ledwith, Reactivity, Mechanism and Structure in Polymer Chemistry, John Wiley & Son, London, N.Y., 1974, page 465.

To initiate the free-radical polymerization, free-radical formers are employed in amounts from 0.001 to 2, preferably from 0.02 to 0.8, % by weight, relative to the total weight of the non-optional reactants. Examples of free-radical formers which may be employed are azo initiators, such as azo esters, azo-imino esters or azo-N-alkylamides, peroxides, such as di-tert, butyl peroxide, dicumyl peroxide, or di-benzoyl peroxide, per-esters, such as amyl perpivalate tert butyl perpivalate, tert, butyl peroctoate, t-butyl perbenzoate, or tert butyl per-neodecanoate, percarbonates, such as cyclohexyl per carbonate or biisopropyl percarbonate, or hydroperoxides such as, for example, cumyl hydroperoxide or tert butyl hydroperoxide.

Suitable initiators also include benzopinacol and benzopinacol derivatives, or other thermally unstable, highly substituted ethane derivatives.

The polymerization can also be initiated at lower temperatures than those corresponding to the thermal decomposition temperatures of the free-radical formers with the aid of redox systems.

Examples of redox initiators which may be employed are combinations of peroxides and amines, such as, for example, benzoyl peroxide and triethylamine, trialkylboron compounds and oxygen, hydroperoxides and sulphinic acids, formaldehyde or aldoses, or combinations containing low-valent transition metal salts and sulphury dioxide/peroxide redox systems.

The polymerization reaction can be carried out continuously or discontinuously, under atmospheric pressure or under reaction pressures up to, for example, 300 bar, preferably up to 15 bar, at reaction temperatures between −20° C. and +250° C., preferably from 70° to 190° C. Thorough mixing, as referred to herein, can be accomplished by high shear mechanical mixers, such as high intensity mixers and colloid mills.

Heat may be applied to the completed mixture of components or the components may be introduced to the mixture as heat is applied. The elevated reaction temperature should be maintained from about 30 seconds to about 3 hours.

While the heating and mixing steps can be performed sequentially, or simultaneously, it is preferred that the components be first thoroughly mixed, and then heated with high shear mixing.

The total polymerization reaction including the time during which heat, if employed, is applied, is typically carried out for between about 30 seconds to about 8.3 hours. Preferably, it is carried out for between about 5 to about 60 minutes.

If desired, the polymerization can also be carried out in the presence of solvents or diluents, water, alcohols, such as methanol, ethanol and tert-butanol, aliphatic or aromatic hydrocarbons, halogenohydrocarbons, such as chlorobenzene or fluorinated compounds, ethers, such as dioxane or tetrahydrofuran, and esters, such as, for example, ethyl acetate, but the polymerization is preferably carried out in the absence of a solvent.

If desired, the polymerization reaction may also be carried out in the presence of molecular-weight regulators. Mercaptans, such as n- or tert-dodecylmercaptan, thioglycol, thoglycerol or thioacetates may be employed as regulators. Furthermore, sulphur free molecular-weight regulators can be used, such as hydrocarbons examples which include paraffin fractions, such as, for example, petroleum ether, light naphtha, alpha-olefins, such as, for example, propylene, isobutylene or but-1-ene, and ketones, such as acetone, methyl ethyl ketone or cyclohexanone and aldehydes, such as formaldehyde, acetaldehyde, propionaldehyde or isobutyraldehyde, or allyl compounds, such as allyl alcohol, allyl acetate, isobutene diacetate or allyl carbonates. Further suitable teloqens, such as halogenohydrocarbons including for example as methylene chloride, tetrachloroethane, dibromoethane, may be employed.

Although reaction products which are useful in the practice of the instant invention may have rubber-like consistencies and therefore viscosities approaching infinity, the reaction product typically possesses a viscosity of between about 50,000 and about 5,000,000 cSt. However, utility as an antifoam requires a viscosity of between about 100 and about 10,000 cSt; preferably between about 4,000 and about 8,000 cSt. Thus, to achieve the required viscosity, the reaction product must be diluted with appropriate quantities of polysiloxanes, including those of formula (I), having viscosities of between about 5 and about 500 cSt. Preferred for this purpose are polysiloxanes which possess viscosities of between about 50 and 150 cSt. Optional solvents and oils, as described below, may also serve as viscosity lowering diluents.

Optional, non-essential ingredients can be included in the compositions of the present invention, provided they do not adversely affect the foam suppressing activity of the compositions of the present invention. Examples of such ingredients include, but are not limited to, dyes, sterilants, mineral oil, kerosene, solvents, compatabilizing agents such as those described in U.S. Pat. No. 4,519,319, and antibacterial preparations. The amounts of such optional, non-essential ingredients are not taken into account as part of the total weight of the claimed composition, either in ascertaining the respective percentages of its components, or in determining the amount of foam suppressant composition of the present composition to be added to a liquid.

The foam suppressant composition of the present invention is added to a liquid medium in an amount such that existing foam or the formation of foam will be suppressed. The amount necessary for this purpose can vary from 0.5 ppm, to about 200 ppm of composition. The specific amount added is determined by the stability of the foam to be suppressed. Typically, an amount of foam suppression composition from about 25 ppm to about 100 ppm is sufficient. Additional quantities of the claimed composition may be required.

Whereas the exact scope of the instant invention is set forth in the appended claims, the following specific examples illustrate certain aspects of the present invention and, more particularly, point out methods of evaluating the same. However, the examples are set forth for illustration only and are not be construed as limitations on the present invention except as set forth in the appended claims. All parts and percentages are by weight unless otherwise specified.

EXAMPLES

Example 1

Antifoam preparations were conducted with a N-50 Hobart mixer fitted with a custom made Plexiglass top. A rubber gasket formed a seal between the top and a Hobart 4.5 L stainless steel mixing bowl. Nitrogen was introduced through a line connected to one hole in the top and a second hole served as both a nitrogen vent and as an addition port for introduction of vinyl monomer. A standard Hobart paddle was fitted with Teflon TM blades formed to fit the contours of the mixing bowl. The bowl was heated with a heating mantle and the temperature was controlled with a Cole Parmer Dyna-sense TM temperature controller. The thermocouple for the temperature controller was placed in the drain hole of the mixing bowl.

To a Hobart mixing bowl containing 250 g of 60,000 cst silicone oil and 27 g heptane was added 8 g hydrophobic fumed silica marketed as Tullanox TM 500 (Tulco Inc., Ayer, Mass.). The mixture was placed in the Hobart mixer and heated to 70° C. under nitrogen. Thirty minutes after coming to temperature, 0.7 g benzoyl peroxide was added and mixed for ten minutes. 15 g of freshly distilled methyl methacrylate was then added, via a dropping funnel, over a period of ten minutes and the mixture was stirred for an additional three hours to give a very viscous elastic composition. A pourable hazy product, hereinafter referred to as AF1, was obtained after the addition of 400 g of 50 cst silicone oil.

Antifoam compounds were emulsified for evaluation by foam rise tests in aqueous media by the following procedure. The emulsifier concentrate was prepared by melting a mixture containing 170 g Span TM 60 and 130 g of Myri TM 52S in a Hobart mixer. Hot water in an amount of 300 g was slowly added to the mixer to form an emulsifier paste. A 250 mL plastic beaker containing 32.2 g AF1, 17.4 of the emulsifier concentrate, 49.55 g water, 0.6 g poly(sodium acrylate) thickener, marketed as Acrysol ASE 60 (Rohm and Haas), 0.15 g 20% NaOH, and 0.1 g of an antibacterial agent, marketed as Givguard, was mixed with a propeller stirrer at room temperature for about 30 minutes to give an oil-in-water emulsion with an active solid content of 30 percent. The pH of the emulsion was adjusted to 8 with NaOH as required. Microscope inspection revealed a course emulsion with most droplets having diameters within the range of 1 to 20 micrometers.

Antifoam tests were conducted as follows. Antifoam emulsion was weighed into 250 mL of freshly prepared 0.5% w/v aqueous sodium dodecyl sulfate, hereinafter SDS, (BDH 44215 "specially purified grade for biochemical work") which was added to a 1 liter graduated cylinder. Humidified nitrogen was introduced via an Ace Glass Pore C, ASTM 25–50 um glass frit attached to a glass tube and suspended down through the center of the cylinder. The gas flow rate was regulated at 0.42 standard liters per minute. Foam and liquid heights were recorded as a function of time and results for AF1 are given in Table 1.

TABLE 1

Foam heights as a function of time for 100 ppm (active solids) AF1 in 0.5% SDS.

| TIME (s) | FOAM VOLUME (mL) | |
|---|---|---|
| | AF1 | no antifoam* |
| 10 | 35 | 110 |
| 100 | 40 | 840 |
| 1000 | 65 | >900 |
| 10000 | 190 | >900 |
| 20000 | 300 | >900 |

*900 mL was approximately the greatest volume of foam which could be measured in the foam rise apparatus.

Example 2

AF2 was prepared by exactly the same procedure as AF1 in Example 1 except that no methyl methacrylate was added. Results are set forth in Table 1A.

The foam testing results in Table 1 reveal that initial foam control was AF2 was comparable to that of AF1; however, the outstanding durability of AF1 was not observed with AF2.

TABLE 1A

| TIME (s) | FOAM VOLUME (mL) |
|---|---|
| 10 | 25 |
| 100 | 35 |
| 1000 | >525 |
| 10000 | >900* |
| 20000 | >900* |

Example 3

The composition and procedures described in Example 1 were repeated with the following changes, thereby producing AF3. The amount of fumed silica added was doubled to 16 g and the 50 cst silicone oil was added 1.5 hours after the methyl methacrylate addition. Foam rise data are given in Table 2.

TABLE 2

Foam heights as a function of time for 100 ppm (actives) AF3 in 0.5% SDS.

| TIME (s) | FOAM VOLUME (mL) |
|---|---|
| 10 | 35 |
| 100 | 45 |
| 1200 | 55 |

TABLE 2-continued

Foam heights as a function of time for 100 ppm (actives) AF3 in 0.5% SDS.

| TIME (s) | FOAM VOLUME (mL) |
| --- | --- |
| 2400 | 70 |

Example 4

The composition and procedures described in Example 1 were repeated with the exception that the amount of methyl methacrylate was doubled to 32 g. Foam rise results for the product, herein designated AF4, are summarized in Table 3.

TABLE 3

Foam heights as a function of time for two concentrations of AF4 in 0.5% SDS.

| | FOAM VOLUME (mL) | |
| --- | --- | --- |
| TIME (s) | 60 ppm | 100 ppm |
| 10 | 40 | 40 |
| 700 | 55 | 45 |
| 2600 | 75 | 45 |
| 6200 | — | 65 |

Example 5

AF5 was prepared with undistilled vinyl acetate in place of methyl methacrylate using the procedures described in Example 1. Foam rise data shown in Table 4 indicate that the product, AF5, was a very potent antifoam in 0.5% SDS.

TABLE 4

Foam heights as a function of time for 60 ppm AF5 in 0.5% SDS.

| TIME (s) | FOAM VOLUME (mL) |
| --- | --- |
| 10 | 60 |
| 100 | 95 |
| 1000 | 140 |
| 2000 | 180 |
| 4000 | 230 |

Example 6

Hydrophilic silica marketed as Cab-O-Sil HS-5 TM (Cabot Chem. Corp.) was used instead of fumed silica to prepare AF6 by the procedure described in Example 1. Results of antifoam testing are given in Table 5.

TABLE 5

| | FOAM VOLUME (mL) | |
| --- | --- | --- |
| TIME (s) | 100 ppm | 50 ppm |
| 10 | 40 | 50 |
| 1000 | — | 70 |
| 3600 | 65 | — |
| 4000 | — | 175 |
| 5000 | — | 270 |
| 6000 | — | 330 |

Example 7

Hydrophobic precipitated silica, marketed as Sipernant TM D10 (Degussa Corp, Teterboro, N.J.) was used instead of fumed silica as in Example 1 to prepare AF7. Similarly, silica marketed as Aerosil TM 972 (Degussa) was used to prepare a test AF8 by the methods described in Example 1. The antifoam test results are summarized in Table 6.

TABLE 6

Foam volumes as a function of time for 100 ppm of AF7 and AF8 in SDS.

| | FOAM VOLUME (mL) | |
| --- | --- | --- |
| TIME (s) | AF7 | AF8 |
| 10 | 55 | 100 |
| 50 | — | 405 |
| 70 | — | 560 |
| 1000 | 60 | >900 |
| 2000 | 85 | >900 |
| 3600 | 105 | >900 |

Example 8

375 g of 60,000 cst polydimethylsiloxane was placed in the Hobart apparatus and heated to 70 degrees under nitrogen. 1.05 grams of benzoyl peroxide were then added. Thirty minutes later, 2.8 g methyl methacrylate was added. After stirring the mixture for 1 hour at 70 degree C., an additional 42 g of methyl methacrylate were slowly added and the mixture was stirred for 3 hours at temperature to produce AF9, a gray elastic material.

25 g of AF9 were mixed with 40 g of 50 cst polydimethylsiloxane to form AF10 which was emulsified by the procedure described in Example 1. The foam rise data for AF10 in Table 7 indicates significant antifoam activity which is noteworthy considering AF10 contains no silica.

TABLE 7

Foam volumes as a function of time for AF10 in SDS.

| | FOAM VOLUME (mL) | | |
| --- | --- | --- | --- |
| TIME (s) | 1200 ppm | 800 ppm | 400 ppm |
| 10 | 30 | 20 | 35 |
| 100 | 30 | 30 | 55 |
| 1000 | 155 | 260 | 700 |

Example 9

40 g of AF9 were mixed with 0.58 q of the fumed silica of Example 1 and 64 g 50 cst silicone oil to form AF11, which was then emulsified by the procedure described in Example 1. Comparison of the foam rise results in Table 8 for AF11 with those in Table 1 for AF1 indicates that a much more potent antifoam results if silica is present during the polymerization rather than if it is added following the polymerization.

TABLE 5

| TIME (s) | FOAM VOLUME (mL) |
| --- | --- |
| 10 | 20 |
| 100 | 70 |
| 800 | 700 |

Example 10

To the apparatus described in Example 1 were added 237.5 g of 10,000 cst silicone oil marketed by Union Carbide Corporation as L 45 TM, 12.5 g of pendant vinyl silicone gum stock with a viscosity of about 2,000,000 cSt and a pendant vinyl content of about 0.2 wt. % which is marketed by Union Carbide as W-982, 8.0 g of the silica of Example 1. The mixture was then heated to 80° C, and stirred under nitrogen. After 1 hour, 1 g benzoyl peroxide and 16 cc of distilled methyl methacrylate were added and the mixture was stirred for an additional 3 hours. At this point the contents of the mixer were viscous and displayed significant elasticity.

400 g 50 cSt L-45 TM were then added and mixed in to give antifoam compound AF12, the test results for which are shown in Table 9.

TABLE 9

Foam volumes in the presence of 100 ppm antifoam AF12 results for duplicated experiments using 0.5% SDS and 0.1% of a non-ionic surfactant marketed by Union Carbide Corporation as TERGITOL ™ NP-10 are shown.

| TIME (s) | FOAM VOLUME (cc) | | | |
|---|---|---|---|---|
| | SDS | | TERGITOL NP-10 | |
| 10 | 40 | 40 | 25 | 25 |
| 100 | 50 | 40 | 30 | 30 |
| 1000 | 50 | 50 | 35 | |
| 2000 | 50 | 65 | 40 | 35 |
| 4000 | | | 55 | |
| 7000 | 150 | | | |
| 12000 | | | | 105 |
| 15000 | | | | 120 |

Example 11

The preparation described in the previous Example was repeated using a series of pendant vinyl silicone oils characterized by different vinyl contents. 500,000 cst silicone oil, having no vinyl content, was used as a control. The antifoam test results are summarized in Table 10.

TABLE 10

Foam volumes as a function of time for a series of antifoam made with different pendant vinyl silicone oils. The antifoam concentrations were 100 ppm, the surfactant was 0.5% SDS and the emulsions were prepared by the procedure described in Example 1.

| | AF13 | AF12 | AF14 | AF15 | AF16 |
|---|---|---|---|---|---|
| % Vinyl | 0 | 0.2 | 5 | 13 | 20 |
| TIME (s) | SDS FOAM VOLUMES (cc) | | | | |
| 10 | 45 | 40 | 90 | 100 | 65 |
| 100 | 160 | 50 | 710 | 720 | 300 |
| 1000 | — | 50 | — | — | — |
| 2000 | — | 50 | — | — | — |
| 7000 | — | 150 | — | — | — |

Example 12

A series of antifoam compounds were prepared based on Example 10 with varying amounts of W982 pendant vinyl silicone oil having a 02. wt. % vinyl content. Foam rise test data are summarized in Table 11.

TABLE 11

Foam volumes as a function of time for a series of antifoams made with different concentrations of 0.2 weight percent pendant vinyl silicone oil.

| | AF17 | AF18 | AF12 | AF19 |
|---|---|---|---|---|
| Wt % | 0 | 0.93 | 1.86 | 3.72 |
| TIME (s) | SDS FOAM VOLUMES (cc) | | | |
| 10 | 30 | 20 | 40 | 50 |
| 100 | 80 | 100 | 50 | 65 |
| 1000 | 300 | 500 | 50 | 85 |
| 2000 | 365 | — | 50 | 105 |
| 3000 | — | — | — | 185 |
| 4000 | — | — | — | 375 |
| 7000 | — | — | 150 | |
| Wt. % | 0 | 0.93 | 1.86 | 3.72 |
| TIME | TERGITOL NP10 FOAM VOLUMES | | | |
| 10 | 25 | 25 | 25 | 30 |
| 100 | 35 | 80 | 30 | 30 |
| 1000 | 405 | — | 35 | 35 |
| 2000 | — | — | — | 40 |
| 3000 | — | — | 55 | |

TABLE 11-continued

Foam volumes as a function of time for a series of antifoams made with different concentrations of 0.2 weight percent pendant vinyl silicone oil.

| | AF17 | AF18 | AF12 | AF19 |
|---|---|---|---|---|
| 4000 | — | — | 120 | |

Example 13

A series of antifoam compounds, based on the composition described in Example 10, were prepared using silicone oils with different viscosities. The results are summarized in Table 12.

TABLE 12

Influence of silicone oil viscosity on antifoam performance. The base composition is given in Example 10. The antifoam concentrations were 100 ppm, the surfactants were 0.5% SDS and 0.1% TERGITOL NP-10

| | AF20 | AF21 | AF12 | AF22 |
|---|---|---|---|---|
| Visc. | 350 | 1000 | 10000 | 60000 |
| TIME (s) | SDS FOAM VOLUMES (cc) | | | |
| 10 | 60 | 70 | 40 | 35 |
| 100 | 420 | 440 | 50 | 40 |
| 1000 | — | — | 50 | 45 |
| 2000 | — | — | 50 | 50 |
| 3000 | — | — | — | — |
| 4000 | — | — | — | 60 |
| 7000 | — | — | 150 | |
| TIME (s) | TERGITOL NP10 FOAM VOLUMES (cc) | | | |
| 10 | | | 25 | 20 |
| 100 | | | 30 | 20 |
| 1000 | | | 35 | 35 |
| 2000 | | | — | 60 |
| 3000 | | | — | 300 |
| 4000 | | | 55 | 675 |
| 15000 | | | 120 | — |

Example 14

The antifoam preparation described in Example 10 was repeated without methyl methacrylate (MMA) addition. Table 13 compares antifoam test results for compounds with and without vinyl monomer. Both materials are good foam control agents; however, the composition containing methyl methacrylate was superior.

TABLE 13

Foam volumes as a function of time for antifoams made with and without methyl methacrylate. The base antifoam composition is given in Example 10. The antifoam concentrations were 100 ppm, and the surfactant was 0.5% SDS and the emulsions were prepared by the procedure described in Example 1.

| | AF23 | AF12 |
|---|---|---|
| Wt. % MMA | 0 | 2.23 |
| TIME (s) | SDS FOAM VOLUMES (cc) | |
| 10 | 65 | 40 |
| 100 | 140 | 50 |
| 1000 | 295 | 50 |
| 2000 | 500 | 50 |
| 3000 | — | — |
| 4000 | — | — |
| 7000 | — | 150 |

Example 15

The type of agitation is an important aspect of antifoam preparation. The composition described in Example 10 was repeated in a Ross Double Planetary Mixer and the resulting antifoam was a creamy white material instead of the opaque elastic material associated with durable antifoams. Table 14 compares antifoam tests results - clearly the same composition when prepared in a Ross mixer was inferior. A possible explanation is that in the Ross mixer there was about a 1 cm gap between the mixing blades and the side of the bowl which was about an order of magnitude greater than the Hobart. This in turn means the Ross mixer puts much less fluid mechanical work into the antifoam.

TABLE 14

Comparison of foam volumes as a function of time for an antifoam made in two different mixers. The antifoam composition and procedures are given in Example 10. The antifoam concentrations were 100 ppm, the surfactant was 0.5% SDS and the emulsions were prepared by the procedure described in Example 1.

|  | AF24 | AF12 |
| --- | --- | --- |
| Mixer | Ross | Hobart |
| TIME (s) | SDS FOAM VOLUMES (cc) | |
| 10 | 90 | 40 |
| 100 | 650 | 50 |
| 160 | 930 | 50 |
| 1000 | — | 50 |
| 2000 | — | 50 |
| 3000 | — | — |
| 4000 | — | — |
| 7000 | — | 150 |

Example 16

The importance of agitation during antifoam compound preparation is further demonstrated as follows. The composition described in Example 10 was repeated; however, for most of the preparation the mixer turned off. That is, every 20 minutes the mixer was turned on for 30 s at the lowest speed setting. Antifoam test results for this material is compared to the antifoam described in Example 10 in Table 15. Clearly, less mixing results in a less durable antifoam.

TABLE 15

Comparison of foam volumes as a function of time for an antifoam made with and without mixing. The antifoam composition and procedures are given in Example 10. The antifoam concentrations were 100 ppm, the surfactant was 0.5% SDS and the emulsions were prepared by the procedure described in Example 1.

|  | AF25 | AF12 |
| --- | --- | --- |
|  | SDS FOAM VOLUMES (cc) | |
| TIME (s) | NO STIRRING | NORMAL STIRRING |
| 10 | 90 | 40 |
| 100 | 540 | 50 |
| 200 | 845 | 50 |
| 1000 | — | 50 |
| 2000 | — | 50 |
| 3000 | — | 50 |
| 4000 | — | — |
| 7000 | — | 150 |

Example 17

Antifoam compound AF26 was prepared by first mixing in a Hobart 8g Tullanox TM 500, 12.5 g W982, 237.5 g of 10,000 cst silicone oil which was mixed for 1 hour at 130° C under nitrogen followed by the addition of 1g dicumyl peroxide. After a further 3 hours mixing the compound was diluted with 400 g 50 cst L 45. Emulsions were made by the procedure described in Example 10.

AF27 and AF28 were made the same way as was AF26 except that more vinyl-substituted silicone oil were used, (25g and 18 8 g, respectively) with a corresponding decrease in the amount of 10000 cst silicone oil.

AF27 and AF28 formed a rubbery mass which could not be diluted or emulsified. Antifoam rest results for AF26 are given in Table 16. Although not as effective as some of the compounds containing methyl methacrylate, AF26 was very active. Dicumyl peroxide offers the advantage of better control of silicone branching. On the other hand, the high temperature needed for initiator decomposition requires pressured reactors in order to contain methyl methacrylate.

TABLE 16

Foam volumes versus time for antifoam compound AF26.

|  | SDS | TERGITOL NP-10 |
| --- | --- | --- |
| TIME (s) | FOAM VOLUMES (cc) | |
| 100 | 80 | 70 |
| 100 | 165 | 110 |
| 1200 | 245 | 150 |
| 2000 | 290 | 210 |
| 4000 | 550 | 420 |

Example 18

Antifoam compounds AF28 and AF29 were based on the same composition as AF12 in Example 10 with the following changes. AF28 was initiated with 2,4 -dichlorobenzoyl peroxide and was heated for 3 hours at 65° C. followed by 1 hour at 80° C. AF29 was initiated with p-chlorobenzoyl peroxide for 3 hours at 80° C. followed by 1 hour at 95° C. The compounds were diluted with 50 cst L-45 and were emulsified as described in previous examples.

Antifoam tests results for AF28 and AF29 are given in Table 17. The dichloro peroxide gave a more durable antifoam than did p-chlorobenzoyl peroxide.

TABLE 17

Foam volumes versus time for antifoam compounds prepared with substituted peroxides

| | FOAM VOLUMES (cc) | | | |
| --- | --- | --- | --- | --- |
| | AF28 | | AF29 | |
| TIME (s) | SDS | Tergitol NP-10 | SDS | Tergitol NP-10 |
| 10 |  | 20 | 50 | 50 |
| 100 | 50 | 25 | 125 | 275 |
| 1000 | 50 | 30 | 475 | — |
| 2000 | 65 | 35 | 665 | — |
| 4000 | 90 | 40 | — | — |
| 7000 | 150 | — | — | — |

We claim:

1. A process for the production of a foam suppressant composition comprising
    1) reacting a mixture of
        a) from about 80 to about 98 wt.%, based upon the total weight of reactants a, b and c, of at least one polyorganosiloxane having the formula

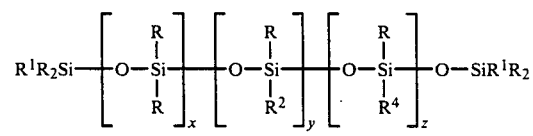

wherein R represents an alkyl group having from 1 to about 6 carbon atoms; $R^1$ represents a hydrogen atom, a hydroxyl group, an alkyl group having from 1 to about 16 carbon atoms, an epoxy group having from 2 to about 16 carbon atoms or the group —OR$^3$ wherein R$^3$ represents an alkyl group having from 1 to about 16 carbon atoms, an arylalkyl group having from about 7 to about 23 carbon atoms or —OR$^3$ may be a polyoxyalkylene group having a molecular weight of from about 50 to 5000; R$^2$ represents an alkyl group having from 1 to about 16 carbon atoms, a phenyl group, a hydrogen atom, an alkyl-substituted phenyl group wherein the alkyl group contains from 1 to about 6 carbon atoms, an epoxy group having from about 2 to about 16 carbon atoms, or a polysiloxane group having a molecular weight of from about 100 to about 10,000; y is an integer ranging from 5 to about 10,000; and the sum of x, and y ranges from about 500 to about 10,000, b) from about 0.1 to about 30 wt. %, of amphorous silica based upon the total weight of reactants a, b and c; and c) from about 0.0001 to about 2 wt. %, based upon the total weight of reactants a, b and c of at least on free radical initiator catalyst, d) optionally, from about 0 to about 20 wt. %, based upon the total weight of reactants a, b and c of at least one vinyl monomer, e) optionally, from about 0 to about 20 wt.,% based upon the total weight of reactants a, b, and c of a vinyl-modified polyorganosiloxane of the formula

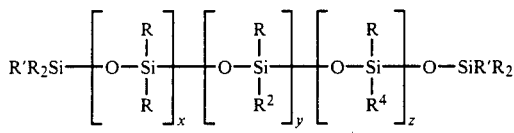

wherein R represents an alkyl group having from 1 to about 6 carbon atoms; R$^1$ represents a hydrogen atom, a hydroxyl group, an alkyl group having from 1 to about 16 carbon atoms, an epoxy group having from 2 to about 16 carbon atoms or the group —OR$^3$ wherein R$^3$ represents an alkyl group having from 1 to about 16 carbon atoms, an arylalkyl group having from about 7 to about 23 carbon atoms or —OR$^3$ may be a polyoxyalkylene group having a molecular weight of from about 50 to about 5000; R$^2$ represents an alkyl group having from 1 to about 16 carbon atoms, a phenyl group, a hydrogen atom, an alkyl-substituted phenyl group wherein the alkyl group contains from 1 to about 6 carbon atoms, an epoxy group having from about 2 to about 16 carbon atoms, or a polysiloxane group having a molecular weight of from about 100 to about 10,000; R$^4$ represents a vinyl group containing from 2 to about 24 carbon atoms; y is an integer ranging from 0 to about 10,000; z is an integer ranging from 0 to about 400; and the sum of x, y and z ranges from about 500 to about 10,000;

under conditions and for a time sufficient such that free radical polymerization occurs and a polymerization product forms; and 2) diluting the polymerization product formed through the reaction of the above described materials with sufficient quantities of a polydiorganosiloxane having a viscosity of about 10 to about 300 cst. such that a final composition having a viscosity of about 100 to about 10,000 cst. is produced.

2. The process of claim 1 wherein R, R$^1$, and R$^2$ of polydiorganosiloxane (a) are methyl groups, x is an integer ranging from about 600 to about 4000, and y is 0.

3. The process of claim 2 wherein R, R$^1$, and R$^2$ of polydiorganosiloxane (a) are methyl groups and x ranges from about 800 to about 2000.

4. The process of claim 2 wherein the amphorous silica has a surface area of from about 50 m$^2$/g to about 400 m$^2$/g and an average particle size less than about 100 micrometers as determined by the Hegman Gauge.

5. The process of claim 4 wherein the amphorous silica has a surface area of from about 100 m$^2$/g to about 300 m$^2$/g and an average particle size less than about 50 micrometers as determined by the Hegman Gauge.

6. The process of claim 4 wherein the amphorous silica is prehydrophobized fumed silica.

7. The process of claim 1 wherein the silica (b) is present in amounts of from about 0.1% to about 10%, by weight, based upon the total weight of reactants (a), (b) and (c).

8. The process of claim 7 wherein the silica (b) is present in amounts of from about 2% to about 4%, by weight, based upon the total weight of reactants (a), (b) and (c).

9. The process of claim 6 wherein the silica (b) is present in amounts of from about 2% to about 4%, by weight, based upon the total weight of reactants (a), (b) and (c).

10. The process of claim 1 wherein the free radical initiator catalyst comprises benzoyl peroxide.

11. The process of claim 1 wherein the vinyl monomer is selected from the group consisting of olefins, vinyl esters of aliphatic or aromatic carboxylic acids, (meth)acrylic acid, methyl (meth)acrylate, ethyl (meth)acrylate, propyl or isopropyl (meth)acrylate, n-butyl, iso-butyl or tert butyl (meth)acrylate, 2-ethyl-hexyl(meth)acrylate, (meth)acrylamide, N-alkyl-substituted (meth)acrylamide derivatives, (meth)acrylonitrile, maleic anhydride, maleic acid amide, N-alkyl-malemide, maleic acid half esters or diesters, vinyl aromatics, vinyl chloride, vinylidene chloride, vinylidene fluoride, tetrafluoroethylene, vinyl ethers, allyl compounds and mixtures thereof.

12. The process of claim 10 wherein the vinyl monomer is selected from the group consisting of vinyl acetate and methyl methacrylate.

13. The process of claim 1 wherein the vinyl-modified polyorganosiloxane (e) is present in amounts of from about 2 to about 10 wt. %, based upon the total weight of reactants (a), (b) and (c).

14. The process of claim 13 wherein the vinyl-modified polyorganosiloxane (e) is present in an amount of about 5 wt. %, based upon the total weight of the reactants (a), (b) and (c).

15. The process of claim 1 wherein R and R$^1$ of polydiorganosiloxane (e) are methyl groups and x is an integer ranging from about 5000 to about 10000, y is 0 and z is an integer ranging from about 5 to 25.

16. The process of claim 15 wherein R and R$^1$ of polydiorganosiloxane (e) are methyl groups and x is an integer ranging from about 3000 to about 8000, y is 0 and z is an integer ranging from about 5 to 20.

17. The process of claim 15 wherein R and R$^1$ of polydiorganosiloxane (e) are methyl groups and x is an integer ranging from about 6000 to about 8000, y is 0 and z has a value of about 14.

18. A foam suppressant composition comprising
1) the reaction product of a) from about 80 to about 98 wt.%, based upon the weight of the reactants (a), (b) and (c), of at least one polyorganosiloxane having the formula

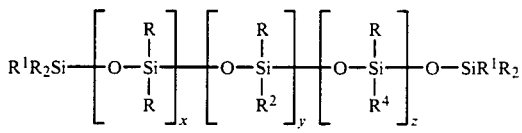

wherein R represents an alkyl group having from 1 to about 6 carbon atoms; $R^1$ represents a hydrogen atom, a hydroxyl group, an alkyl group having from 1 to about 16 carbon atoms, an epoxy group having from 2 to about 16 carbon atoms or the group —$OR^3$ wherein $R^3$ represents an alkyl group having from 1 to about 16 carbon atoms, an arylalkyl group having from about 7 to about 23 carbon atoms or —OR3 may be a polyoxyalkylene group having a molecular weight of from about 50 to about 5000; $R^2$ represents an alkyl group having from 1 to about 16 carbon atoms, a phenyl group, a hydrogen atom, an alkyl-substituted phenyl group wherein the alkyl group contains from 1 to about 6 carbon atoms, an epoxy group having from about 2 to about 16 carbon atoms, or a polysiloxane group having a molecular weight of from about 100 to about 10,000; y is an integer ranging from 0 to about 10,000; and the sum of x and y ranges from about 500 to about 10,000.

b) from about 0.1 to about 30 wt. %, of amphorous silica based upon the total weight of reactants a, b and c; and c) from about 0.0001 to about 2 wt. %, based upon the total weight of reactants a, b and c of at least on free radical initiator catalyst, d) optionally, from about 0 to about 20 wt. %, based upon the total weight of reactants a, b and c of at least one vinyl monomer, e) optionally, from about 0 to about 20 wt. % based upon the total weight of reactants a, b, and c of a vinyl-modified polyorganosiloxane of the formula

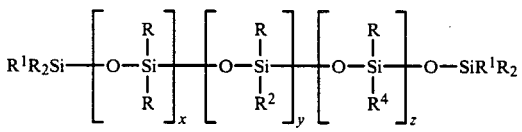

wherein R represents an alkyl group having from 1 to about 6 carbon atoms; $R^1$ represents a hydrogen atom, a hydroxyl group, an alkyl group having from 1 to about 16 carbon atoms, an epoxy group having from 2 to about 16 carbon atoms or the group —$OR^3$ wherein $R^3$ represents an alkyl group having from 1 to about 16 carbon atoms, an arylalkyl group having from about 7 to about 23 carbon atoms or —OR3 may be a polyoxyalkylene group having a molecular weight of from about 50 to about 5000; $R^2$ represents an alkyl group having from 1 to about 16 carbon atoms, a phenyl group, a hydrogen atom, an alkyl-substituted phenyl group wherein the alkyl group contains from 1 to about 6 carbon atoms, an epoxy group having from about 2 to about 16 carbon atoms, or a polysiloxane group having a molecular weight of from about 100 to about 10,000; $R^4$ represents a vinyl group containing from 2 to about 24 carbon atoms; y is an integer ranging from 0 to about 10,000; and the sum of x, y and z ranges from about 500 to about 10,000;

said reaction product being formed under conditions for a time sufficient such that free radical polymerization occurs; and 2) diluting the reaction product with sufficient quantities of a polydiorganosiloxane having a viscosity of about 10 to about 300 cst. such that a final composition having a viscosity of about 100 to about 10,000 cst. is produced.

19. The composition of claim 18 wherein R, $R^1$ and $R^2$ of polydiorganosiloxane (a) are methyl groups, x is an integer ranging from about 600 to about 4000, and y is 0.

20. The composition of claim 19 wherein R, $R^1$ and $R^2$ polydiorganosiloxane (a) are methyl groups and x ranges from about 800 to about 2000.

21. The composition of claim 19 wherein the amphorous silica has a surface area of from about 50 m²/g to about 400 m²/g and an average particle size less than about 100 micrometers as determined by the Hegman Gauge.

22. The composition of claim 21 wherein the amphorous silica has a surface area of from about 100 m²/g to about 300 m²/g and an average particle size less than about 50 micrometers as determined by the Hegman Gauge.

23. The composition of claim 22 wherein the amphorous silica is prehydrophobized fumed silica.

24. The composition of claim 18 wherein the silica (b) is present in amounts of from about 0.1% to about 10%, by weight, based upon the total weight of reactants (a), (b) and (c).

25. The composition of claim 24 wherein the silica (b) is present in amounts of from about 2% to about 4%, by weight, based upon the total weight of reactants (a), (b) and (c).

26. The composition of claim 24 wherein the silica (b) is present in amounts of from about 2% to about 4%, by weight, based upon the total weight of reactants (a), (b) and (c).

27. The composition of claim 18 wherein the free radical initiator catalyst comprises benzoyl peroxide.

28. The composition of claim 18 wherein the vinyl monomer is selected from the group consisting of olefins, vinyl esters of aliphatic or aromatic carboxylic acids, (meth)acrylic acid, methyl (meth)acrylate, ethyl (meth)acrylate, propyl or isopropyl (meth)acrylate, n-butyl, iso-butyl or tert butyl (meth)acrylate, 2-ethylhexyl(meth)acrylate, (meth)acrylamide, N-alkyl-substituted (meth)acrylamide derivatives, (meth)acrylonitrile, maleic anhydride, maleic acid amide, N-alkylmalemide, maleic acid half esters or diesters, vinyl aromatics, vinyl chloride, vinylidene chloride, vinylidene fluoride, tetrafluoroethylene, vinyl ethers, allyl compounds and mixtures thereof.

29. The composition of claim 28 wherein the vinyl monomer comprises vinyl acetate.

30. The composition of claim 28 wherein the vinyl monomer comprises methyl methacrylate.

31. The composition of claim 18 wherein the vinyl-modified polyorganosiloxane (e) is present in amounts of from about 2 to about 10 wt. %, based upon the total weight of reactants (a), (b) and (c).

32. The composition of claim 31 wherein the vinyl-modified polyorganosiloxane (e) is present in an amount of about 5 wt. %, based upon the total weight of reactants (a), (b) and (c).

33. The composition of claim 18 wherein R and R$^1$ of polydiorganosiloxane (e) are methyl groups and x is an integer ranging from about 5000 to about 10000, y is 0 and z is an integer ranging from about 5 to 25.

34. The composition of claim 33 wherein R and R$^1$ of polydiorganosiloxane (e) are methyl groups and x is an integer ranging from about 3000 to about 8000, y is 0 and z is an integer ranging from about 5 to 20.

35. The composition of claim 33 wherein R and R$^1$ of polydiorganosiloxane (e) are methyl groups and x is an integer ranging from about 6000 to about 8000, y is 0 and z has a value of about 14.

36. A process for suppressing foam, or the formation of foam, in a liquid medium comprising adding the composition of claim 18 to said medium in quantities sufficient to suppress said foam or said formation of foam.

* * * * *